Oct. 6, 1970     T. D. SIDDALL ET AL     3,532,273

WASHING APPARATUS

Filed May 28, 1968

TERENCE D. SIDDALL &
GERALD BUCKINGHAM,
INVENTORS

BY *Stephen H. Frishauf*
ATTORNEY

United States Patent Office 3,532,273
Patented Oct. 6, 1970

3,532,273
WASHING APPARATUS
Terence Derwent Siddall, New Found Out Farm, Hailey, and Gerald Buckingham, Witney, England; said Buckington assignor to said Siddall
Filed May 28, 1968, Ser. No. 732,748
Claims priority, application Great Britain, May 30, 1967, 24,826/67
Int. Cl. B05b 3/04
U.S. Cl. 239—222.17                     2 Claims

ABSTRACT OF THE DISCLOSURE

A sprayhead for tank washing apparatus in the form of a spinner means comprising a coniform spinner disposed with a surface on the flow path axis of liquid discharged through a nozzle, to deflect liquid radially outwardly to a ring of reverted tooth forms which spin or spray the liquid outwardly, has the spinner journalled in the mouth of the nozzle and on a pivot pin engaging in a bearing opposite the nozzle mouth.

PRIOR APPLICATION

Priority, Great Britain May 30, 1967 and Oct. 20, 1967, application No. 24,826/67.

The invention concerns improvements relating to spinner means, more particularly although not exclusively for washing apparatus, for example, for washing out the interior of storage tanks, such as bulk milk storage tanks installed at dairy farms and from which the milk is transferred to a tanker vehicle for transport elsewhere.

Such a tank, which may for example be of up to 1,000 gallons capacity, after emptying needs to be properly cleansed before being refilled at the next milking. The washing apparatus used for this purpose normally comprises washing apparatus used for this purpose normally comprises a spray head assembly in the form of a spinner means inserted into the tank, the rinse water or other cleansing medium being supplied to the spinner means at relatively high pressure, by pump means pereferably.

An object of the invention is to provide an improved sprayhead assembly or spinner means, particularly for such washing apparatus.

According to the invention, there is provided spinner means comprising a nozzle, a spinner which is located in a flow path of the water or other liquid to be discharged through the nozzle and which has a conical form on the flow path axis presenting a surface to deflect the liquid radially outwards to a ring of reverted tooth forms of the spinner so that the liquid spins or sprays out in many directions including radially outwards and backwards, a spinner mounting arm extending laterally of the nozzle to present a pivot bearing located on the nozzle axis and opposite a mouth of the nozzle, a boss of the conical form being freely located in said mouth and a pivot pin of the spinner being engaged in said bearing so that the spinner is rotated about a common axis of the spinner and nozzle by flow through a nozzle.

Further features and advantages of apparatus according to the invention will become apparent from the embodiment hereinafter described by way of example with reference to the accompanying drawings wherein.

Figure 1:
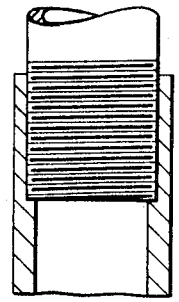
FIG. 1 is an axial section of a spinner means according to the invention.

The spinner means generally indicated at 14 comprises a convergent nozzle 60 and a spinner mounting arm 61 extending laterally from the nozzle to present a pivot bearing 62 located on the nozzle axis and opposite a mouth 63 of the nozzle. A spinner 64 has a conical form 65 presenting a boss 66 which is freely located in the mouth 63 to leave an annular flow path 67. A pivot pin 68 has a tapered end 69 engaged in the bearing 62, and is formed with a substantially spherical head 70 which is received past retaining lip means 70A into an axial bore 71 at the side of the spinner remote from the boss 66, so as to allow a limited degree of tilting of the spinner relative to the pin. The arm 61 is suitably flexed to receive the spinner. The conical form 65 on the flow path axis presents a surface 72 to deflect the liquid forced through the annular path 67 radially outwards to a ring of reverted tooth forms 73 of the spinner. The spinner is rotated about the common axis of the spinner and the nozzle by flow through the nozzle, so that the liquid spins or sprays out in many directions including radially outwards and backwards, such as indicated at 74. The spinner has an opening in the form of a passage 75 extending along the axis of the spinner to emerge into the axial bore 71 in the region of the pivot pin and bearing. Another passage 76 extends from the conical surface 72 to emerge in the region of the apex of a space 77 formed in the remote side of the spinner. These passages 75 and 76 allow liquid to pass through the spinner and emerge in the directions indicated at 78 and 79 respectively.

The spinner means is of suitable plastics material such as polypropylene and the spinner mounting arm may be of stainless steel.

In operation the spinner means acts to distribute the liquid so that a milk tank interior for example in which the spinner means is positioned, is cleansed most effectively. The passages 75, 76 through the spinner allow the liquid to pass to the remote side of the spinner and emerge as indicated at 78 and 79 so as to ensure proper cleansing and sterilisation of the remote side of the spinner itself and of the spinner mounting, and of the corresponding tank region. The limited tilting allowed of the spinner relative to the pivot pin affords a self-aligning effect under the action of the liquid flow. The retaining lip means 70A does not obstruct the axial flow of water but prevents the pin 68 from accidentally falling into the tank and being drawn through the tank outlet 15A (e.g. 2 ins. diameter) into a collecting road tanker with the milk; the combined spinner and pin are too large to pass through that outlet. Thus the spinner is self-aligning and the spinner means is substantially self-cleaning. Also, a vibratory cleaning effect is introduced in operation because of the self-aligning pivot action. The friction at the bearing is minimized by lubrication from the liquid passing, through the axial passage in the spinner. The spinner assembly is neat and compact, and relatively cheap to produce.

The spinner as described has the further advantage that it can be mounted at any angle including upside down, if desired, and is thus independent of gravity.

Figure 2:
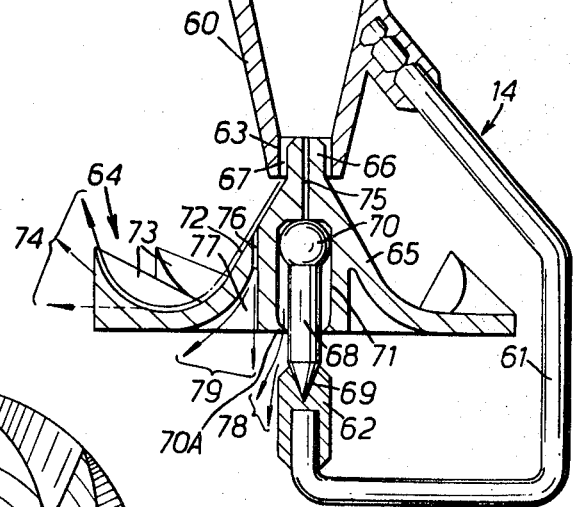
FIG. 2 is a plan of the spinner of such spinner means.
Figure 2:
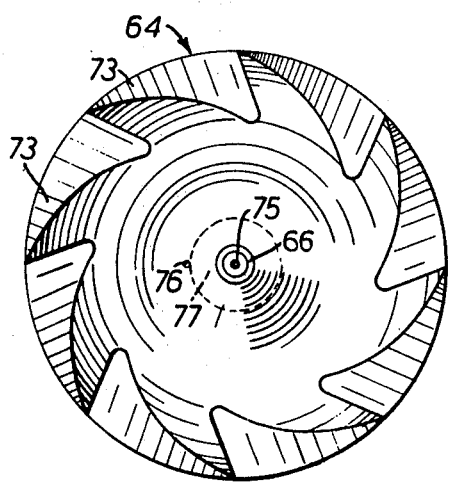

Although the reverted tooth forms are shown to be of the same size and equally spaced in FIG. 2, they may be unequally spaced and unequally sized, if desired, so as to vary the spray pattern produced.

We claim:
1. Spinner means comprising:
   a nozzle discharging a liquid;
   a spinner located in a flow path of the liquid discharged through said nozzle, said spinner having an axial bore therein and a conical form on the flow path axis presenting a surface to deflect the liquid radially outwards;
   a ring of reverted tooth forms on the spinner to spray the liquid in a plurality of directions including radially outwards and backwards;

a boss on the conical form of said spinner and loosely located as a bearing in said nozzle;

a spinner mounting arm extending laterally of the nozzle and including a pivot bearing located on the nozzle axis on the side of said spinner opposite the nozzle; and a pivot pin mounted between said pivot bearing and said spinner, said pivot pin having at one end thereof a spherical head engaged in said axial bore of said spinner;

said spinner being supported by said loosely located boss and said pivot pin and being rotatable with a degree of tilting about a common axis of the spinner and nozzle by means of the liquid flowing through the nozzle.

2. Spinner means as claimed in claim 1, in which said spinner has a passage extending from the cone size of said spinner into said axial bore to allow passage of liquid through said spinner into the region of said pivot pin and pivot bearing.

References Cited

UNITED STATES PATENTS 538,008    4/1895    Burns _____ 239—222.17

FOREIGN PATENTS 1,013,062    4/1952    France.
1,100,119    3/1955    France.
15,055    7/1896    Great Britain.

LLOYD L. KING, Primary Examiner